United States Patent [19]

Majewski et al.

[11] Patent Number: 4,994,661
[45] Date of Patent: Feb. 19, 1991

[54] OPTICAL TWO-DIMENSIONAL SERVO-LOOP FOR LASER BEAM STABILIZATION AND/OR POSITION ENCODING

[75] Inventors: Wojciech Majewski, Ottawa, Canada; David Plusquellic, Pittsburgh, Pa.

[73] Assignee: University of Pittsburgh, Pittsburgh, Pa.

[21] Appl. No.: 289,990

[22] Filed: Dec. 23, 1989

[51] Int. Cl.$^5$ .................... G01J 1/20; G01B 11/26; B23K 26/32

[52] U.S. Cl. ........................ 250/203.1; 356/152; 219/121.78

[58] Field of Search ............... 250/201, 203 R, 203.1, 250/203.2, 201.1, 201.4; 369/46, 44, 119; 219/121.81, 121.79, 121.78; 356/141, 152; 318/640, 648, 649

[56] References Cited

U.S. PATENT DOCUMENTS

| | | | |
|---|---|---|---|
| 2,891,239 | 6/1959 | Parsons | 250/201 |
| 4,117,319 | 9/1978 | White, III | 250/201 |
| 4,287,410 | 9/1981 | Crane et al. | 250/201 |
| 4,349,732 | 9/1982 | Whitby et al. | 250/201 |
| 4,468,119 | 8/1984 | Hamar | 356/152 |
| 4,532,402 | 7/1985 | Overbeck | 219/121.78 |
| 4,618,759 | 10/1986 | Müller et al. | 219/121.78 |
| 4,721,385 | 1/1988 | Jelalian et al. | 356/152 |
| 4,782,474 | 11/1988 | Arai et al. | 250/201 |

*Primary Examiner*—David C. Nelms
*Assistant Examiner*—Michael Messinger
*Attorney, Agent, or Firm*—Reed Smith Shaw & McClay

[57] ABSTRACT

The present invention pertains to an electrooptical tracking system. The invention includes means for producing a coherent beam of light and means for deflecting the beam of light. The deflecting means deflects the beam of light with respect to a first and second direction corresponding to a first signal, with the first direction being approximately orthogonal to the second direction. The deflecting means also produces a second signal corresponding to the deflection of the light beam by the deflecting means. The location of the light beam is determined by means for detecting the location of the light beam with respect to the first and second directions. The detecting means is aligned to receive the beam of light that has been deflected by the deflecting means. The detecting means also provides the first signal to the deflecting means corresponding to the detected location of the light beam with respect to the first and second directions.

10 Claims, 2 Drawing Sheets

OPTICAL TWO-DIMENSIONAL SERVO-LOOP FOR LASER BEAM STABILIZATION AND/OR POSITION ENCODING

FIELD OF THE INVENTION

The present invention is related to a tracking system. More specifically, the present invention relates to detecting the location of a light beam associated with an object being tracked in order to control the position of the object and to use the detected signals to replicate the motion of an object moving in two-dimensional space.

BACKGROUND OF THE INVENTION

Currently, instruments used in a wide range of applications such as manufacturing or research and development have achieved a high level of sensitivity with respect to the job they perform. Many of these same instruments also require a correspondingly accurate alignment to perform or interact with other similarly sensitive instruments. Unfortunately, many of the environments which these instruments are required to operate in are not conducive to the accurate performance of the instruments. For instance, floors or tables upon which the instruments rest are not level, or nearby motor vehicle traffic causes vibration that introduces misalignment.

An optical tracking system disclosed in U.S. Pat. No. 3,757,125 to Okada et al. uses the phase of light reflected from an object to determine the objects position relative to a selected position of the object. The apparatus taught by Okada et al. is typical of most known tracking systems in that the position of the object is determined by directly tracking it. From the determined position a feed back loop is utilized to stabilize the object. One significant problem with such a tracking system is the range the system is able to track an object. If the object being tracked moves essentially a small distance, then the object becomes out of range and tracking ends.

An apparatus that has been used to determine the position of a light beam with respect to tracking for misalignment purposes is the four-quadrant photodetector. For example, U.S. Pat. No. 3,579,140 to Anderson et al. discloses a four-quadrant photodetector for use in aligning a continuous wave laser.

Scanning systems have also used orthogonal deflection to control a light beam with respect to two dimensions. U.S. Pat. No. 4,314,154 to Minoura et al. discloses a two-dimensional scanning device having compensation for scanned image strain.

None of the aforementioned devices expands the range an object can be followed, nor do they take advantage of indirect tracking of an object of interest.

The present invention is a tracking system that provides a much greater tracking range than heretofore known. The present invention, instead of tracking the object directly, utilizes a light beam associated with the object. The light beam is deflected through an orthogonal deflection system, which controls the position of the light beam with respect to two dimensions, onto a detector such as a four-quadrant photodetector that determines the position of the light beam. By knowing the position of the light beam on the detector, the position of the object from which the light beam eminates is determined. The use of orthogonal deflection, and the tracking indirectly of the object by way of the detector, allows for a much greater tracking range of movement of the object. The position of the object is then able to be controlled with some form of a feedback loop.

SUMMARY OF THE INVENTION

The present invention pertains to an electrooptical tracking system. The invention includes means for producing a coherent beam of light and means for deflecting the beam of light. The deflecting means deflects the beam of light with respect to a first and second direction corresponding to a first signal, with the first direction being orthogonal to the second direction. The deflecting means also produces a second signal corresponding to the deflection of the light beam by the deflecting means. The location of the light beam is determined by means for detecting the location of the light beam with respect to the first and second directions. The detecting means is aligned to receive the beam of light that has been deflected by the deflecting means. The detecting means also provides the first signal to the deflecting means corresponding to the detected location of the light beam with respect to the first and second directions.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
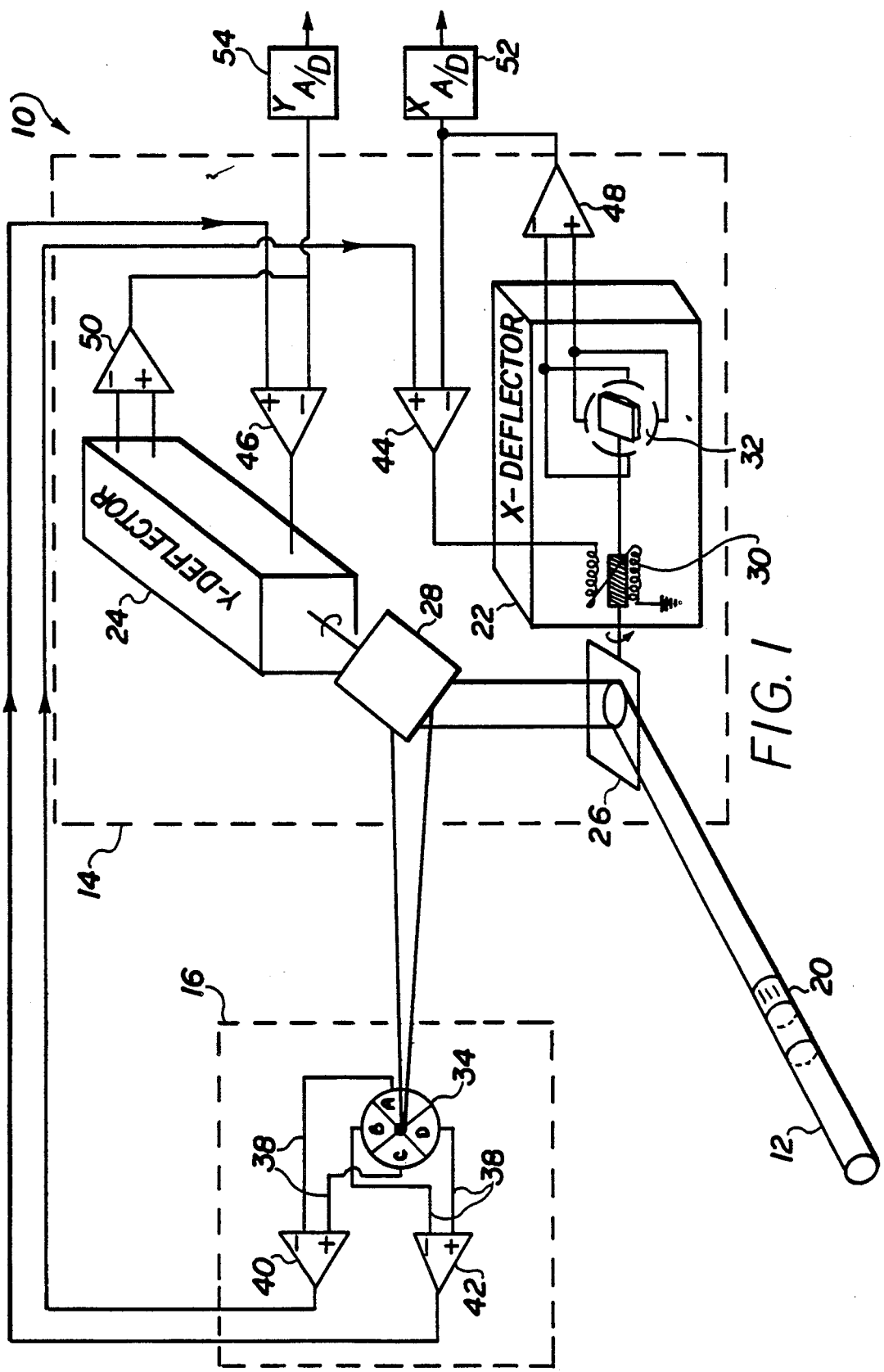
FIG. 1 is a perspective view of the laser tracking system.

Referring now to the drawings, wherein like reference numerals designate identical or corresponding parts throughout the several views, and more particularly to FIG. 1 thereof, an electro-optical tracking system 10 is shown. The system 10 includes means 12 for producing a coherent beam of light and means 14 for deflecting the beam of light. The deflecting means 14 deflects the beam of light with respect to a first and second direction corresponding to a first signal, with the first direction being orthogonal to the second direction. The deflecting means 14 also produces a second signal corresponding to the deflection of the light beam by the deflecting means 14. The location of the light beam is determined by means 16 for detecting the location of the light beam with respect to the first and second directions. The detecting means 16 is aligned to receive the beam of light that has been deflected by the deflecting means 14. The detecting means 16 also provides the first signal to the deflecting means 14 corresponding to the detected location of the light beam with respect to the first and second directions.

More specifically the light producing means 12 such as a light emitting diode or, preferably, a laser produces a coherent beam of light detectable by four-quadrant photodetectors. The light beam produced by the laser 12 is focused to the deflecting means 14 by beam expanding and focusing optics 20 as is well known in the art.

The light deflecting means 14 deflects the beam of light with respect to a first and second direction. The deflecting means 14 also produces a second signal corresponding to the deflection of the light beam by the deflecting means 14. The light deflecting means 14 may be comprised of a first deflecting means 22 and a second deflecting means 24. The first deflecting means 22 deflects the light beam with respect to the first direction, for instance the x direction, corresponding to a first signal and also produces a second signal corresponding to the deflection of the light beam with respect to the x direction.

The second deflecting means 24 deflects the light beam with respect to the second direction, for instance the y direction, corresponding to a third signal, and produces a fourth signal corresponding to the deflection of the light beam with respect to the y direction. The first and second, or x and y, directions are orthogonal to each other. The second deflecting means 24 is aligned to deflect the light beam in the y direction after the first deflecting means 22 has deflected the beam in the x direction. However, since the two directions are orthogonal to each other it does not matter which order the deflection with respect to the directions occurs. This is because the reflection of the beam in the x direction has no effect on the deflection of the beam in the y direction, and vice versa. (Note that the directions do not have to be exactly orthogonal for accurate operation).

The amount the light beam is deflected is controlled by a first signal that is received by the deflecting means 14. In the embodiment using a first and second deflecting means 22, 24, a first signal controls the amount of deflection of the beam in the x direction by the first deflection means, and a third signal controls the amount of deflection of the beam in the y direction by the second deflecting means.

The deflection may be accomplished by the first and second deflecting means 22, 24 through the use of first mirror 26 and second mirror 28 that are part of the respective deflecting means. The first mirror 26 is aligned at the proper angle to receive and then to deflect by a desired amount the light beam from the laser 12 to the second mirror 28. The second mirror 28 is aligned at the proper angle to receive and then to deflect by a desired amount the light beam from the first mirror 26 of the first deflecting means to the detecting means 16.

The first deflecting means 22 and the second deflecting means 24 can control their respective mirrors with, for example a magnetic driver 30 that is part of each deflecting means 22, 24. In each deflecting means the magnetic driver is connected to the mirror. The current that flows through the magnetic driver, from the first signal with respect to the first deflecting means 22 and the third signal with respect to the second deflecting means 24, determines the amount of torque applied to the mirror and consequently, how much the mirror is rotated and the light beam deflected.

The magnetic driver 30 of each deflecting means is also linked to a position sensor 32 of each deflecting means. The position sensor 32 in each deflecting means follows the movement of the respective mirror caused by the respective magnetic driver 30 or vice versa. The position sensor 32 also produces a second signal and a fourth signal corresponding to the deflection of the first mirror 26 and the second mirror 28, respectively. The second signal that is produced by the first deflecting means 22 is with respect to the x direction, and the fourth signal produced by the second deflecting means is with respect to the y direction. The second and fourth signals can be used to control additional devices as is discussed more fully below. See the reference manuals of General Scanning Corp.'s galvanometer scanners for a full discussion of the operation of first and second deflection means having the above described attributes.

The detecting means 16 detects the location of the light beam with respect to the first and second, or x and y, directions. The deflecting means can, for example be a four-quadrant photodetector 34 that is initially positioned to receive the deflected light beam from the second deflecting means 24. The four-quadrant photodetector 34 is comprised of four geometrically separated photodetector elements A, B, C and D that are symmetrically arranged around a common center point 36. Each photodetector element produces a current proportional to the amount of light it receives. The individual photodetector elements can be designed so the further from the center 36 the light beam strikes an individual photodetector element the greater the voltage that is produced therein. The individual photodetector elements are chosen to operate effectively at the frequency of the light beam.

The detecting means 16 provides the first signal to the deflecting means 14. The first signal is proportional to the distance the light beam is from a predetermined position on the detector means 16. In the embodiment where the detector means 16 includes a four-quadrant photodetector 34, there are also four electrical leads 38, one of which is connected to each individual photodetector element. Each lead has the voltage characteristic of the individual photodetector element A, B, C, or D to which it is connected. The voltage of each individual photodetector element A, B, C, or D is determined by the amount of light from the light beam that is received by each individual photodetector element A, B, C, or D. Each individual photodetector element A, B, C, or D has an arc length of approximately 90°, with the total of the four photodetector elements forming 360°, the arc length of a full circle. Individual photodetector elements A and C are positioned symmetrically around the first direction, or the X direction, and symmetrically opposite to each other, with center 36 therebetween. Individual photodetector elements A and C also have 45° of arc length on each side of the X direction. The individual photodetector elements B and D are similarly situated around the second direction, or y direction, as individual photodetector elements A and C are situated around the x direction. The origin of the x and y directions is located at the center 36 of the four-quadrant photodetector.

The light beam from the laser 12 is of a diameter that is smaller than the diameter of the four-quadrant photodetector 34. However, the diameter of the light beam is large enough so it is evenly received by each individual photodetector elements A, B, C, and D when the beam is focused on the center 36 of the four-quadrant photodetector 34. Essentially the beam should be of such a diameter that it produces an identifiable voltage rise in an individual photodetector element corresponding to the increased portion of the light beam that is received by it relative to an identifiable voltage drop in the symmetrically opposite individual photodetector element corresponding to the decreased portion of the light beam that is received by it. This increase in voltage of an individual photodetector element with a proportional decrease in voltage of the symmetrically opposite individual photodetector follows from the fact that the light beam is essentially fixed in diameter. When a greater portion of the light beam is received by an individual photodetector element, the symmetrically opposite individual photodetector element receives a smaller portion of the light beam. This smaller portion of the light beam is equal to the greater portion of the light beam received by the other individual photodetector. The four-quadrant photodetector design is such that symmetrically opposite individual photodetectors A and C, and B and D are related through the portion of the light beam they share. They determine the position of the light beam, or more exactly the position of the object (not shown) upon which the laser is mounted, with respect to the x and y directions, respectively.

Figure 3:
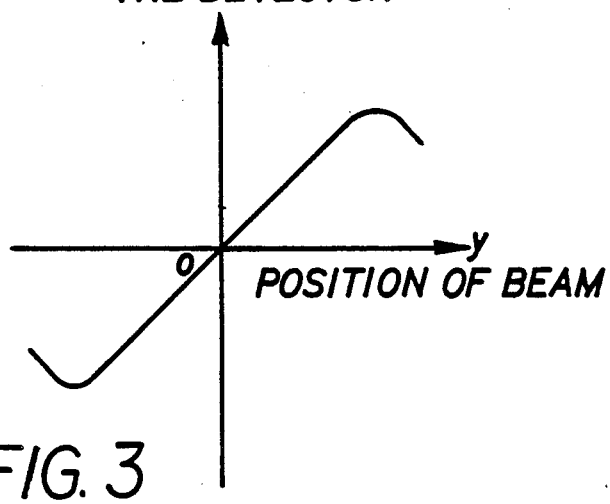
FIG. 3 is a graph of the output voltage of the detector versus beam position with respect to the Y direction.
Figure 2:
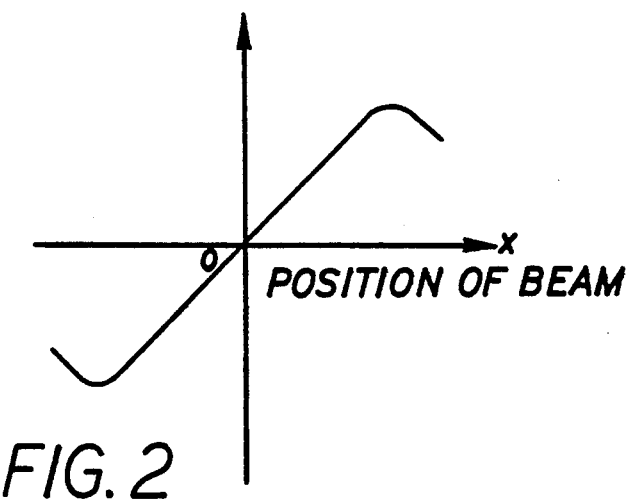
FIG. 2 is a graph of the output voltage of the detector versus beam position with respect to the X direction.

To take advantage of the possible differences in voltages between symmetrically opposite individual photodetector elements that reveal the location of the light beam with respect to the x and y direction, leads 38 from symmetrically opposite individual photodetector elements A and C, and B and D are connected to a first differential amplifier 40 and a second differential amplifier 42, respectively. The first differential amplifier 40 produces a signal corresponding to the difference in voltage between individual photodetectors A and C. The signal produced by amplifier 40 corresponds to the distance off-center and the direction off-center the light beam is with respect to the x direction. The distance the light beam is off-center is represented by the amplitude of the signal, and the direction the light beam is off-center is represented by the sign (positive or negative) of the signal. See FIG. 2 which shows the voltage as a function of the distance from the center 36 the light beam strikes the photodetector 34 with respect to the x direction. The determination of the distance and direction of the light beam with respect to the y direction is accomplished similarly with respect to the above description concerning the x direction except individual photodetector elements B and D are linked to differential amplifier 42. See FIG. 3 which shows the voltage as a function of the distance from the center 36 the light beam strikes the photodetector 34 with respect to the y direction. The differential amplifiers 40, 42 are elements of the detector means 16. The operation of the amplifiers 40, 42 is well known in the art.

The first signal produced by the detecting means 16 and corresponding to the position of the light beam with regard to the x and y direction is fed back to the deflecting means 14. The first signal causes the deflecting means to deflect the light beam from the laser 12 towards the center 36 of the detecting means, thus locking the light beam to the center 36. At the same time the deflecting means 14 produces a second signal that corresponds to the deflection of the light beam. This second signal could be connected, for example, to a display device showing the position of the light beam over time. The second signal could also be connected, for example, to the mount (not shown) of the laser 12 causing the mount to return to a desired position so the light beam from the laser is redirected towards the center 36 of the deflecting means 16. Regardless of what the second signal produced by the deflecting means 16 is used for, the feed back of the first signal from the detecting means 16 to the deflecting means 14 forms a servo-loop therebetween locking the laser beam to the center 36 of the detecting means 16.

In the embodiment utilizing a four-quadrant photodetector 34 with first and second amplifiers 40, 42, the first signal produced by the first amplifier 40 is fed back to a third differential amplifier 44 of the first or x deflecting means 22. The third signal produced by the second amplifier 42 is fed back to a fourth differential amplifier 46 of the second or y deflecting means 24. The other input to the third amplifier 44 also receives as input the second signal produced by the x deflecting means 22 that corresponds to the deflection of the light beam with respect to the x direction. The second signal is produced by a fifth differential amplifier 48 that is essentially an angular sensor. The second signal produced by the fifth differential amplifier 48 corresponds to the amount the mirror 26 is angled to deflect the light beam to the center 36 of the four-quadrant photodetector 34 when the light beam is off-center as compared to a position of the mirror 26 that causes the light beam to fall upon the center 36 of the four-quadrant photodetector with respect to the x direction when the light beam is not off-center. The signal produced by the fifth differential amplifier 44 corresponds to the difference between the deflection applied to the light beam to restore the light beam to the center 36 of the four-quadrant photodetector and the distance from the center 36 of the photodetector the light beam is with respect to the x axis. The operation of the invention with respect to the y direction is similar to the operation of the invention with respect to the x direction. The only differences are that a third signal is produced from the second differential amplifier 42 that is analogous to the first signal with regard to the x direction; the third signal is inputted into the fourth differential amplifier 46, which is analogous the third differential amplifier 44 with regard to the x direction; and a sixth differential amplifier 50 produces a fourth signal corresponding to the deflection of the second mirror with regard to the y direction that is analogous to the fifth differential amplifier 48 and the second signal produced therefrom with regard to the x direction.

In a preferred embodiment, a Helium-Neon laser 12 having a wavelength of 6328 angstroms is mounted atop a motorized table (not shown) that can compensate for various forces, such as vibration, applied to it. The beam produced by the laser 12 is focused with beam expanding and focusing optics 20 onto a first mirror 26 of a first General Scanning galvanometer 23 Model G325D which deflects the light beam with respect to the x direction. The laser beam is deflected by the first mirror 26 onto a second mirror 28 of a second General Scanning galvanometer 24 Model G325D that deflects the laser beam with respect to the y direction.

The laser beam is deflected by the second mirror 28 of the second galvanometer 24 onto a four-quadrant photodetector 34. The four-quadrant photodetector is comprised of four individual photodetector elements A, B, C and D symmetrically arranged around the center 36 of the photodetector 34. The four-quadrant photodetector 34 is made by EG&G or Hammamatsa. Individual photodetector elements A and C, and B and D are arranged symmetrically opposite each other along the x and y directions, respectively, with center point 34 therebetween. Individual photodetector elements A and C, and B and D each have a lead 38 connected to a first differential amplifier 40 and a second differential amplifier 42, respectively. The first and second differential amplifiers 40, 42 are made by National Semiconductor. The first signal produced by the first differential amplifier 40 is fed to a third differential amplifier 44 that is part of the first galvanometer 22. The third signal produced by the second differential amplifier 42 is fed to a fifth differential amplifier 46 that is part of the second galvanometer 24. A second and a fourth signal are produced by a fourth differential amplifier 48 and a sixth differential amplifier 50, respectively, that are part of the first galvanometer 22 and the second galvanometer 24, respectively. The second and fourth signals correspond to the deflection of the first mirror 26 and the second mirror 28, respectively. The second and fourth signals are connected to a first analog-to-digital convertor 52 and a second analog-to-digital convertor 54, respectively, and also to the third and fifth differential amplifier 44, 46, respectively.

The analog-to-digital convertors 52, 54 are made by National Semiconductor, and transform the second and fourth signals into a signal form that can be used to control the motorized table upon which the laser 16 is mounted. These signals can be stored in a digitial form to be used later on.

In the operation of the preferred embodiment, when the mount upon which the laser 12 is situated is positioned correctly, the laser beam produced by the laser 12 strikes the first mirror 26 and is deflected to the second mirror 28 such that the beam is received by the photodetector 34 at the center 36 with respect to the x direction. The second mirror 20 deflects the laser beam such that the beam is received by the photodetector 34 at the center 36 with respect to the y direction.

Since the laser beam is received at the center 36 of the photodetector 34, the voltage of symmetrically opposite photodetector elements A and C, and B and D are equivalent, and no first or second signal is produced by the first and second differential amplifier 40, 42 respectively. The fifth and sixth differential amplifiers produce no signal since the first and second mirrors 26, 28 are at the desired deflection position to focus the laser beam at center 36. The third and fourth differential amplifiers 44, 46 of the first and second galvanometers 22, 24 respectively, also produce no signal to change the deflection of the first and second mirrors 26, 28 since there is no first, second, third or fourth signal. Consequently, the laser beam stays focused on the center 36 of the photodetector 34.

When the table upon which the laser 12 is mounted is jarred or for some reason moved, the laser beam no longer is received at the center 36 of the detector 34. After the beam is deflected, the individual photodetector elements that now receive a greater portion of the laser beam than before have a correspondingly higher voltage. The symmetrically opposite individual detector elements receive a lesser portion of the laser beam than before and have a correspondingly lower voltage. For example, if the table has moved by a given amount in both the positive x and y directions, then a larger portion of the laser beam is received by the individual photodetector elements A and B than received by elements C and D. The voltage in element A is greater than the voltage in element C and the voltage in element B is greater than the voltage in element D, with each element A and B having a voltage corresponding to the distance the beam is off-center with regard to the positive x and positive y directions.

Continuing with the circumstances described in the example, the differential amplifier 40 produces a first signal corresponding to the distance the beam is off-center with respect to the x axis since the voltage of element A is greater than the voltage of element C. The differential amplifier 42 produces a third signal corresponding to the distance the beam is off-center with respect to the y axis since the voltage of element B is greater than the voltage of element D.

The first signal is received by the third differential amplifier 44, as well as the second signal from the fourth differential amplifier 48. However, the signal from the fourth amplifier 48 is nonexistent because the first mirror 26 has maintained the same desired deflection since no force has yet been received to alter its position. As a result, the third amplifier 44 produces a fifth signal corresponding to the distance the beam is off center with respect to the x axis. The fifth signal causes the first galvanometer 22 to change the deflection of the first mirror such that the laser beam is refocused onto the center 36 with respect to the x axis. At the same time the deflection of the first mirror 26 is changed, a second signal is produced by the fourth differential amplifier corresponding to the deflection of the first mirror 26. The second signal is converted by the first A/D converter 52 to a form that enables the motorized table to respond to the signal and cause the laser to return to its desired position and thus the laser beam to return to the center 36 with respect to the x direction. The laser beam is focused on the center 36 with respect to the y direction in the same way as described above with respect to the x direction.

After the table is repositioned by the second and fourth signals so the laser beam is refocused on the center 36, there are no first and third signals from the first and second differential amplifiers, respectively. This is because the voltages on symmetrically opposite photodetector elements are again the same.

The second and fourth signals still maintain the table at its new position because the first mirror 26 and second mirror 28 still have a deflection different from the original deflection in order for the laser 12 on the repositioned table to strike the center 36. The second and fourth signals also cause the first mirror 26 and second mirror 28, respectively, to have the proper deflection to focus the laser beam onto the center 36. This is because there is essentially no first or third signal received by the third and fifth operational amplifiers 44, 46, respectively. Accordingly, there is a voltage difference between the two inputs of the third and fifth operational amplifiers 44, 46 with the resulting fifth and sixth signals, respectively, maintaining the necessary deflection for the laser beam to focus onto the center 36. If there is a subsequent movement of the table and thus the laser 12, the same response by the electro-optical tracking system 10 as described above would be followed.

Obviously, numerous (additional) modifications and variations of the present invention are possible in light of the above teachings. It is therefore to be understood that within the scope of the appended claims, the invention may be practiced otherwise than as specifically described herein.

We claim:

1. An electro-optical tracking system comprising:
a laser capable of producing a light beam;
a four-quadrant photodetector capable of detecting the location of the light beam with respect to an x direction and a y direction approximately orthogonal thereto, said four-quadrant photodetector being comprised of a center with four individual photodetector elements disposed symmetrically around the center and two of the individual photodetector elements symmetrically positioned with respect to the x direction and opposite each other so the position of the light beam on the four-quadrant photodetector can be determined with respect to the x direction, and two of the individual photodetector elements symmetrically positioned with respect to the y direction and opposite each other so the position of the light beam on the four-quadrant photodetector can be determined with respect to the y direction;

a first and second differential amplifier, said first differential amplifier electrically connected to the two symmetrically opposite individual photodetector elements with respect to the x direction and being capable of producing a first signal that is proportional to their voltage difference, and the second differential amplifier electrically connected to the two symmetrically opposite individual photodetector elements with respect to the y direction, and being capable of producing a third signal that is proportional to their voltage difference;

a first galvanometer having a first mirror disposed to deflect the light beam with respect to the x direction corresponding to the first signal, and for producing a second signal corresponding to the deflection of the light beam with respect to the x direction, said first galvanometer having a third and a fourth differential amplifier, with the fourth differential amplifier producing the second signal corresponding to the deflection of the first mirror, said first differential amplifier and said fourth differential amplifier being electrically connected to the third differential amplifier which produces a fifth signal proportional to the difference in the signals produced by the first and fourth differential amplifiers for controlling the deflection of the first mirror; and a second galvanometer having a second mirror disposed to deflect the light beam with respect to the y direction from the first mirror to the four-quadrant photodetector corresponding to the third signal, and for producing the fourth signal corresponding to the deflection of the light beam with respect to the y direction, and said second galvanometer having a fifth and sixth differential amplifier with the fifth differential amplifier producing the fourth signal corresponding to the deflection of the second mirror, said second differential amplifier and said fifth differential amplifier being electrically connected to the sixth differential amplifier which produces a signal proportional to the difference in the signals produced by the second and fifth differential amplifiers for controlling the deflection of the second mirror.

2. An electro-optical tracking system comprising:
means for producing a coherent beam of light;
first means for deflecting the beam of light with respect to a first direction corresponding to a first signal, and for producing a second signal corresponding to the deflection of the light beam with respect to the first direction;
second means for deflecting the beam of light with respect to a second direction corresponding to a third signal, and for producing a fourth signal corresponding to the deflection of the light beam with respect to the second direction, said second direction being approximately orthogonal to the first direction, said second deflecting means aligned to deflect the beam of light that has been deflected by the first deflecting means;
means for detecting the location of the light beam with respect to the first and second directions, said detecting means aligned to receive the beam of light that has been deflected by the second deflecting means, said detecting means providing the first signal and third signal to the first deflecting means and the second deflecting means, respectively, said first signal corresponding to the detecting location of the beam with respect to the first direction and causing the first deflecting means to deflect the light beam to a first predetermined position with respect to the first direction, said third signal corresponding to the detecting location of the beam with respect to the second direction and causing the second deflecting means to deflect the light beam to a second predetermined position with respect to the second direction; and
means for producing and detecting said second and fourth signals, which independently control the position of the first and second deflecting means with respect to the first and second directions, said second and fourth signals not limited to the range of motion of the first and second deflecting means.

3. An apparatus as described in claim 2 wherein the means for producing a coherent beam of light is a laser or light emitting diode.

4. An apparatus as described in claims 2 or 3 wherein the first deflecting means is a first galvanometer and the second deflecting means is a second galvanometer.

5. An apparatus as described in claim 4 wherein the detector means includes a four-quadrant photodetector.

6. An apparatus as described in claim 5 wherein the first galvanometer includes a first mirror disposed to deflect the light beam with respect to the first direction and wherein the second galvanometer includes a second mirror disposed to deflect the light beam, with respect to the second direction, from the first mirror to the four-quadrant photodetector.

7. An apparatus as described in claim 6 wherein the first direction is the x direction and the second direction is the y direction.

8. An apparatus as described in claim 7 wherein the four-quadrant photodetector is comprised of a center with four individual photodetector elements disposed symmetrically around the center and two of the individual photodetector elements symmetrically positioned with respect to the x direction and opposite each other so the position of the light beam on the four-quadrant photodetector can be determined with respect to the x direction, and two of the individual photodetector elements symmetrically positioned with respect to the y direction and opposite each other so the position of the light beam on the four-quadrant photodetector can be determined with respect to the y direction; and wherein the detector means includes a first and second differential amplifier, with the first differential amplifier electrically connected to the two symmetrically opposite individual photodetector elements with respect to the x direction and being capable of producing a first signal that is proportional to their voltage difference, and the second differential amplifier is electrically connected to the two symmetrically opposite individual photodetector elements with respect to the y direction, and being capable of producing a third signal that is proportional to their voltage difference.

9. An apparatus as described in claim 8 wherein the first galvanometer has a third and a fourth differential amplifier, with the fourth differential amplifier producing the second signal corresponding to the deflection of the first mirror, said first differential amplifier and said fourth differential amplifier being electrically connected to the third differential amplifier which produces a fifth signal proportional to the difference in the signals produced by the first and fourth differential amplifiers for controlling the deflection of the first mirror; and wherein the second galvanometer has a fifth and sixth differential amplifier with the fifth differential amplifier producing the fourth signal corresponding to the deflection of the second mirror, said second differential amplifier and said fifth differential amplifier being electrically connected to the sixth differential amplifier which produces a sixth signal proportional to the difference in the signals produced by the second and fifth differential amplifiers for controlling the deflection of the second mirror.

10. A position encoding device for detection of an object comprising the electro-optical tracking system of claim 2 from which signals derived from said second and fourth signals resulting from the first and second deflecting means are used to define the position of the object to which a detecting device is in juxtaposition.

* * * * *